(12) United States Patent
Moriyama et al.

(10) Patent No.: US 11,019,230 B2
(45) Date of Patent: May 25, 2021

(54) INFORMATION PROCESSING DEVICE (71) Applicant: SEIKO EPSON CORPORATION, Tokyo (JP)

(72) Inventors: Ryuji Moriyama, Matsumoto (JP); Hiroaki Fukumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/027,100

(22) Filed: Sep. 21, 2020

(65) Prior Publication Data
US 2021/0092246 A1 Mar. 25, 2021

(30) Foreign Application Priority Data
Sep. 24, 2019 (JP) .............. JP2019-172653

(51) Int. Cl.
H04N 1/00 (2006.01)
(52) U.S. Cl.
CPC ..... H04N 1/00496 (2013.01); H04N 1/00411 (2013.01)
(58) Field of Classification Search
CPC .......... H04N 1/00496; H04N 1/00411; H04N 1/00564; G03G 15/5016
USPC ....................................... 358/442
See application file for complete search history.

(56) References Cited

U.S. PATENT DOCUMENTS

| 2007/0115608 A1* | 5/2007 | Tsuji ............ B41J 3/46 361/220 |
| 2008/0232050 A1* | 9/2008 | Muraki ......... G03G 15/5016 361/679.06 |
| 2017/0310838 A1 | 10/2017 | Saito |
| 2020/0290385 A1* | 9/2020 | Fukumoto ........... B41J 29/393 |
| 2020/0322493 A1* | 10/2020 | Ota ............. H04N 1/00496 |

FOREIGN PATENT DOCUMENTS

JP 2017-198751 A 11/2017

* cited by examiner

Primary Examiner — Gabriel I Garcia
(74) Attorney, Agent, or Firm — Workman Nydegger (57) ABSTRACT A information processing device includes an operating panel that includes an operating surface on which an input operation can be performed, and a housing that includes an exterior surface and to which a rotation shaft rotatably supporting the operating panel is coupled. The operating panel includes an exposed surface where the operating panel is exposed, the exposed surface being flush with the exterior surface when the operating panel is in a housed position in which the operating panel is housed in the housing. The operating panel includes a pressing surface at one end and a following surface at another end of the exposed surface with the rotation shaft being a boundary therebetween in plan view of the exposed surface when the operating panel is in the housed position. When the pressing surface is pressed, the operating panel is rotated, and the following surface protrudes outward from the exterior surface.

6 Claims, 6 Drawing Sheets

INFORMATION PROCESSING DEVICE

The present application is based on, and claims priority from JP Application Serial Number 2019-172653, filed Sep. 24, 2019, the disclosure of which is hereby incorporated by reference herein in its entirety.

BACKGROUND

1. Technical Field

The present disclosure relates to an information processing device including an operating panel capable of an input operation.

2. Related Art

Some information processing devices, such as a printer and a multi-functional machine having another function as well as a printing function, include a touch panel that enables various input operations by touching a position of a guide image displayed on a screen with a finger. For example, JP-A-2017-198751 describes an image forming device provided with a rotation member capable of rotating a display unit such as a touch panel.

However, in the image forming device described in JP-A-2017-198751, when the rotation member housed in a housing unit is manually rotated to a position at which the rotation member can support itself, first, it is necessary to have a configuration in which a user can hook a finger onto the rotation member when pulling out the rotation member from the housing unit. Specifically, there has been a need to secure a sufficient space between the housing unit and the rotation member for the finger to be inserted. Since this space is realized by an aspect in which a recessed portion, into which the finger is loosely inserted. is provided on a front surface, namely, an exterior surface of a device housing, there has been a problem in that design is restricted, namely, an improvement in design quality is inhibited when attempting to improve aesthetics of the device by eliminating recesses and protrusions from the exterior surface of the device.

SUMMARY

An information processing device includes an operating panel including an operating surface for accepting an input operation, and a housing including an exterior surface and to which a rotation shaft rotationally supporting the operating panel is coupled. The operating panel is configured to rotate between a housed position in which the operating panel is housed in the housing and a self-supporting position in which at least a portion of an operating surface is held in a state of protruding outward from the exterior surface. The operating panel is provided so that an exposed surface thereof, where the operating panel is exposed, is flush with the exterior surface when the operating panel is in the housed position. The operating panel includes a pressing surface on one side and a following surface on the other side of the exposed surface with respect to the rotation shaft, in plan view of the exposed surface when the operating panel is in the housed position, the pressing surface and the following surface being arranged so that when the pressing surface is pressed, the operating panel rotates and thus the following surface protrudes outward from the exterior surface.

In the information processing device described above, a recessed portion is preferably formed in a side surface of the operating panel intersecting with the following surface.

In the information processing device described above, the pressing surface preferably includes an indication indicating a region for pressing the pressing surface.

In the information processing device described above, the operating panel is preferably provided at the following surface.

In the information processing device described above, the operating surface is preferably provided on the other side of the following surface.

In the information processing device described above, when the operating panel is in the housed position, in plan view of the exterior surface that is flush with the exposed surface, the pressing surface is preferably provided to be closer to an end portion of the exterior surface, in a direction intersecting an extending direction of the rotation shaft, than the following surface.

DESCRIPTION OF EXEMPLARY EMBODIMENTS

1. Embodiment

In the present embodiment, an inkjet-type printer 100 that prints an image or the like by ejecting ink droplets onto a printing medium 1 will be described as an example of an information processing device.

Figure 1:
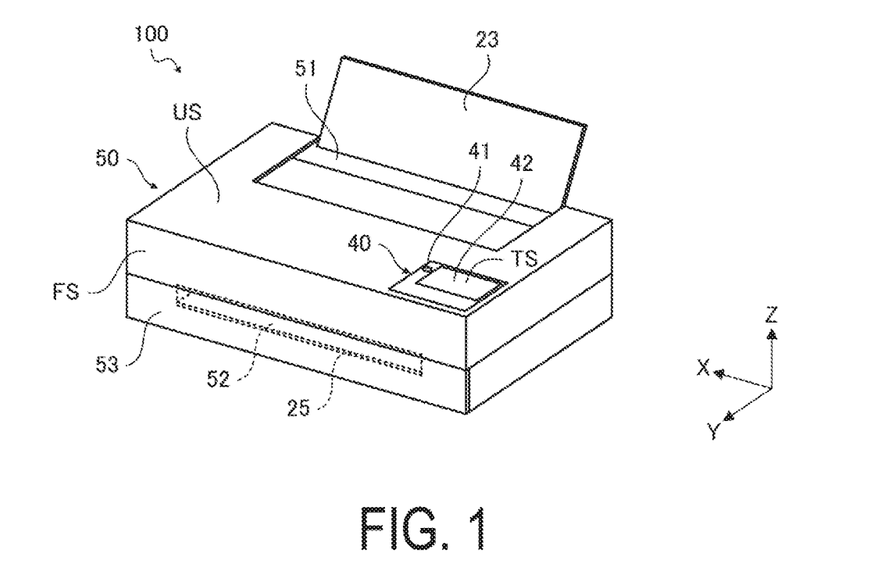
FIG. 1 is a perspective view illustrating an external appearance of a printer that serves as an information processing device according to an embodiment.
Figure 2:
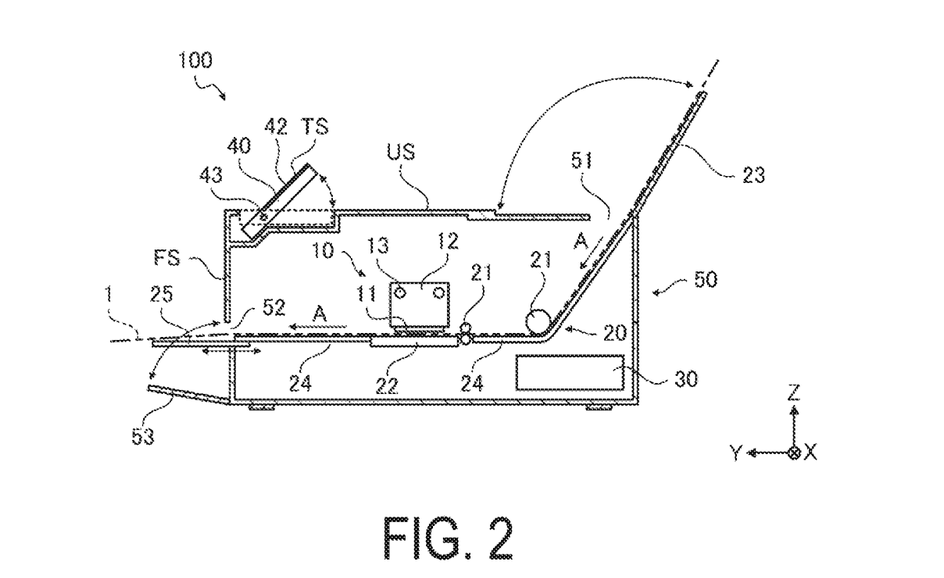
FIG. 2 is a cross-sectional view schematically illustrating an internal configuration of the printer that serves as the information processing device according to the embodiment.

FIG. 1 is a perspective view illustrating an external appearance of the printer 100 according to the embodiment. FIG. 2 is a cross-sectional view schematically illustrating an internal configuration of the printer 100.

Note that, of coordinates noted in the drawings, a Z-axis direction is the vertical direction, a positive Z direction is the up direction, a Y-axis direction is the front-rear direction, a positive Y direction is the front direction, an X-axis direction is the left-right direction, a positive X direction is the left direction, and an X-Y plane is the horizontal plane.

The printer 100 is the inkjet-type printer capable of performing printing on the printing medium 1. The printer 100 is provided with a printing unit 10 that performs the printing on the printing medium 1, a transport unit 20 that transports the set printing medium 1, a control unit 30 that controls the entire printer 100, an operating panel 40 capable of an input operation with respect to the control unit 30, and the like, and is configured as an integrated device by a substantially cuboid housing 50 that is long in the X-axis direction.

The printing unit 10 is configured to include a printing head 11, a carriage 12, a guide shaft 13, and the like.

The printing head 11 is an inkjet head provided with a plurality of nozzles that eject ink.

The printing head 11 is mounted on the carriage 12, and a carriage motor that is driven and controlled by the control unit 30 causes the carriage 12 to reciprocate along the guide shaft 13. The carriage motor is not illustrated in the drawings.

The guide shaft 13 is a member that extends in a width direction of the printing medium 1 intersecting with a transport direction A in which the printing medium 1 is transported, and supports the movement of the carriage 32.

The transport direction A is the direction in which the printing medium 1 moves along a transport path configured by the transport unit 20. In addition, the width direction of the printing medium 1 is the X-axis direction, and the transport direction A in a printing region in which the printing unit 10 performs the printing on the printing medium 1 is the positive Y direction.

The transport unit 20 includes a plurality of transport rollers 21, a platen 22, a back surface support 23, a transport guide 24, a feeding tray 25, and the like, and configures the transport path on which the printing medium 1 can be moved between the back surface support 23 and the feeding tray 25 via the printing region. In FIG. 2, the transport path on which the printing medium 1 is transported is indicated by a two-dot chain line.

The transport roller 21 includes a driven roller that guides the printing medium 1, a driving roller that imparts a transport force to the printing medium 1, and the like.

The platen 22 is disposed in the printing region and supports the printing medium 1 from below in the printing region.

The back surface support 23 is a plate-shaped support member that supports a back surface of the printing medium 1 inserted into a supplying port 51, at the supplying port 51 for the printing medium 1, which is provided to the rear of an upper surface US of the housing 50. The back surface support 23 is provided so as to be rotatable about bearings, which serve as rotational fulcrums, provided in inner walls at both ends of the supplying port 51 in the X-axis direction. When the printer 100 is not used, the back surface support 23 can be rotated to cover the supplying port 51, and can be closed so as to be flush with the upper surface US of the housing 50. Here, the upper surface US is an exterior surface that configures an upper surface of the housing 50. Note that the bearings that rotatably support the back surface support 23 are not illustrated in the drawings.

The transport guide 24 is a member that guides, inside the housing 50, the printing medium 1 transported on the transport path both in front of and beyond the platen 22, from below and from the sides of the printing medium 1.

The feeding tray 25 is a plate-shaped support member that supports the printing medium 1 discharged from a discharge port 52 for the printing medium 1, which is provided below a front surface FS of the housing 50. The feeding tray 25 is provided so as to be movable in the front-rear direction of the housing 50 from a lower end of the discharge port 52. When the printer 100 is not used, the feeding tray 25 can be housed inside the discharge port 52.

Further, a front door 53 that covers the discharge port 52 is provided below the front surface FS of the housing 50, so as to be rotatable using the lower side thereof as a rotation shaft. When the printer 100 is not used, the feeding tray 25 can be housed inside the discharge port 52, and then, the front door 53 can be rotated to cover the discharge port 52 and can be closed so as to be flush with the front surface FS of the housing 50.

The control unit 30 prints an image on the printing medium 1 based on image data received from an external electronic apparatus, such as a personal computer, or an external storage medium, by alternately repeating control of an ejection operation in which ink droplets are ejected from the recording head 11 while moving the carriage 12 in the X-axis direction, and control of a transport operation in which the printing medium 1 is moved in the transport direction by the transport unit 20. Note that the printing unit 10 is configured by a serial head that reciprocates in the X-axis direction as described above, but may be configured by a line head in which the nozzles are arranged in the X-axis direction across the width of the printing medium 1.

The operating panel 40 is provided with a power switch 41 of the printer 100, and a touch panel 42 that includes an operating surface TS on which the input operation, such as inputting an instruction with respect to the control unit 30, can be performed. The operating panel 40 is provided on the right side toward the front of the upper surface US of the housing 50 so as to be rotatable about a rotation shaft 43 and movable between a housed position in which the operating panel 40 is housed in the housing 50, and a self-supporting position in which at least a portion of the operating surface TS protrudes outward, that is, upward from the upper surface US of the housing 50 and is held in an inclined state.

The touch panel 42 is a human interface including the operating surface TS, which is laminated on a display device, such as a liquid crystal display or an organic EL display, and on which the input operation can be performed. For example, a user can select various printing conditions, such as a type of the printing medium 1 to be used and a printing mode, by touching a guide image displayed on the display device via the operating surface TS. The control unit 30 detects a touched position on the touch panel 42, and identifies input of the various printing conditions. As the touch panel 42, a detection method using an electrostatic capacitive system, a resistive film system, or the like can be used.

Figure 3:
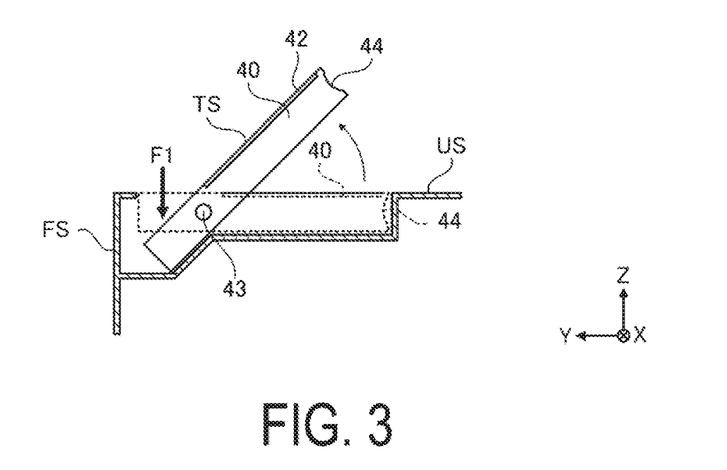
FIG. 3 is a side view illustrating a state of rotation of an operating panel.

FIG. 3 is a side view illustrating a state of rotation of an operating panel.

Figure 4:
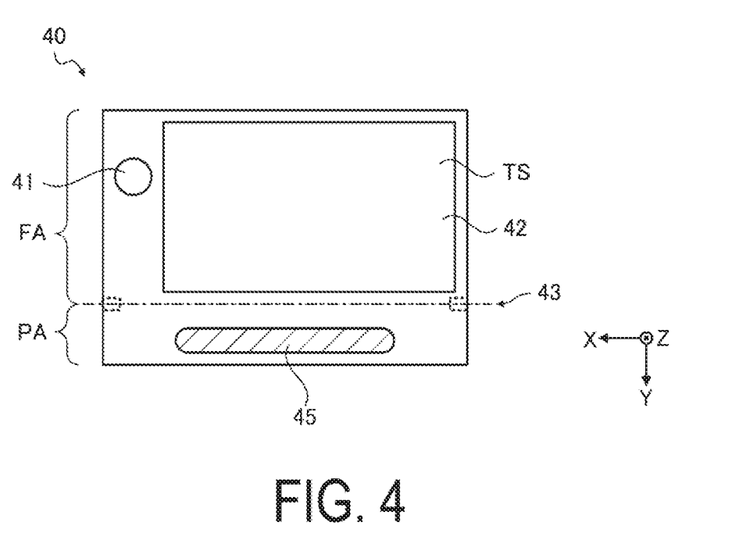
FIG. 4 is a plan view of a state in which the operating panel is in a housed position.

FIG. 4 is a plan view of a state in which the operating panel 40 is in the housed position.

The operating panel 40 illustrated by broken lines in FIG. 3 indicates a posture of the operating panel 40 when it is in the housed position. In addition, the operating panel 40 illustrated by solid lines in FIG. 3 indicates the posture of the operating panel 40 when it is in the self-supporting position.

The operating panel 40 is provided such that when the operating panel 40 is in the housed position, an exposed surface, over which an upper surface of the operating panel 40 is exposed in the upward direction, is flush with the upper surface US of the housing 50. Further, when the operating panel 40 is in the housed position, as illustrated in FIG. 4, in plan view of the exposed surface of the operating panel 40, namely, when the operating panel 40 is seen from above in plan view, a pressing surface PA is arranged at one end of the exposed surface, and a following surface FA is arranged on the other end of the exposed surface with the rotation shaft 43 serving as a boundary therebetween. When the pressing surface PA is pressed in the negative Z direction, the operating panel 40 is rotated about the rotation shaft 43, and the following surface FA is lifted outward, that is, upward from the upper surface US of the housing 50.

Note that when the operating panel 40 is in the housed position, the pressing surface PA and the following surface FA are arranged such that the pressing surface PA, the rotation shaft 43, and the following surface FA are arranged in this order from the front of the printer 100, that is, in this order in the negative Y direction. Further, when the operating panel 40 is in the housed position, in plan view of the upper surface US of the housing 50, which is flush with the exposed surface of the operating panel 40, the pressing surface PA is provided in a position that is closer to one of the end portions of the upper surface US of the housing 50 in the Y-axis direction intersecting with an extending direction of the rotation shaft 43, that is, the X-axis direction, namely, in a position that is closer to the end portion of the upper face US on the positive Y side, than the following surface FA.

Further, a recessed portion 44 is formed in a side surface, of the operating panel 40, that intersects the following surface FA. Specifically, as illustrated in FIG. 3, the recessed portion 44 is formed as the recessed portion extending in the X-axis direction and provided in a side surface of the operating panel 40 on the negative Y side when the operating panel 40 is in the housed position.

When the operating panel 40 is in the housed position, if the pressing surface PA on the front side of the operating panel 40 is pressed in an inward direction of the housing 50, namely, in a direction F1 illustrated in FIG. 3, the operating panel 40 is rotated and the operating surface TS of the touch panel 42 rises toward the front side. As a result, the recessed portion 44 provided on the negative Y side of the lifted operating panel 40 can be hooked by a finger, and this makes it easy for the user to further rotate the operating panel 40 to the self-supporting position.

Note that the side surface in which the recessed portion 44 is provided is not limited to the side surface of the operating panel 40 on the negative Y side. It is sufficient that the recessed portion 44 be provided in a side surface that can be hooked by the finger when the operating panel 40 is rotated and the operating surface TS of the touch panel 42 rises toward the front side. For example, the recessed portion 44 may be provided in a side surface of the operating panel 40 on the negative X side, the side surface intersecting with the following surface FA.

Further, as illustrated in FIG. 4, the pressing surface PA includes a pressing portion mark 45 as an indication indicating a region for pressing the pressing surface PA. It is sufficient that the pressing portion mark 45 be an indication that enables the user to recognize a position to be pressed by the user. For example, the pressing portion mark 45 may be a slight indentation that makes it easier for the user to put a finger on and press the pressing surface PA, a printed indication of characters or a mark indicating an approximate position to be pressed, a thin rubber attached to the pressing surface PA, a rough surface that makes it possible for the user to identify the region to be pressed, and the like.

Further, the operating surface TS of the touch panel 42 on which the input operation can be performed, and the power switch 41 of the printer 100 are provided at the following surface FA in the exposed surface.

Figure 5:
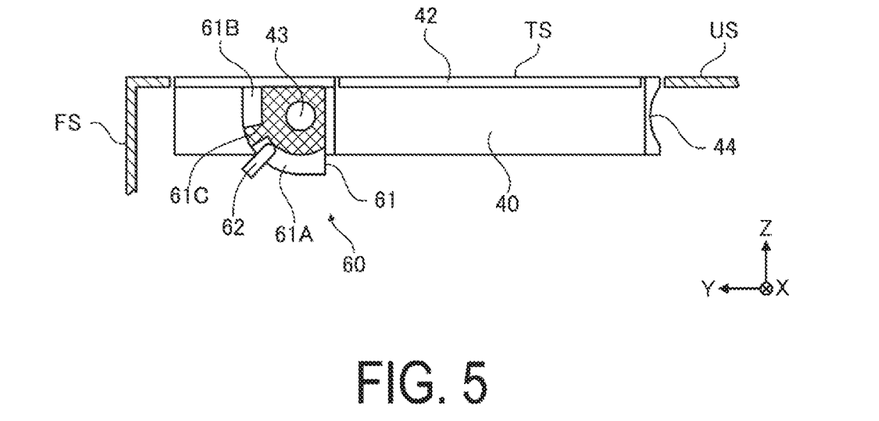
FIG. 5 is a side view illustrating the state in which the operating panel is in the housed position.
Figure 6:
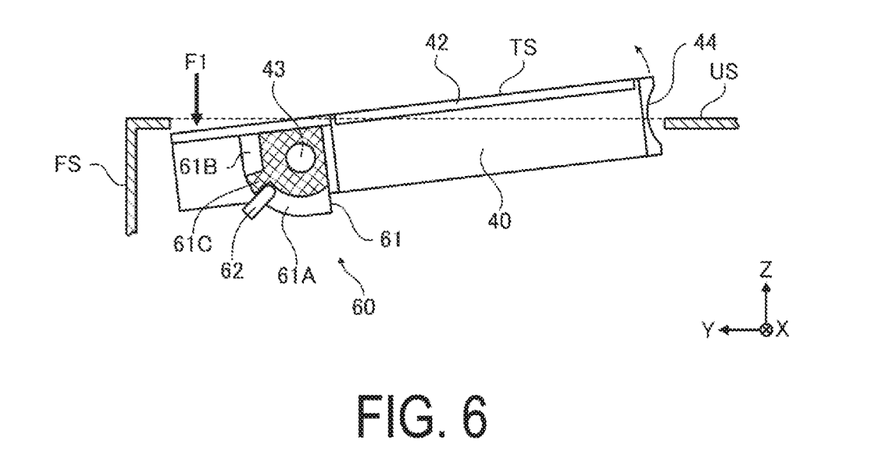
FIG. 6 is a side view illustrating a state in which a pressing surface is pressed, and a leading end portion of the operating panel is slightly lifted from an upper surface of a housing.
Figure 7:
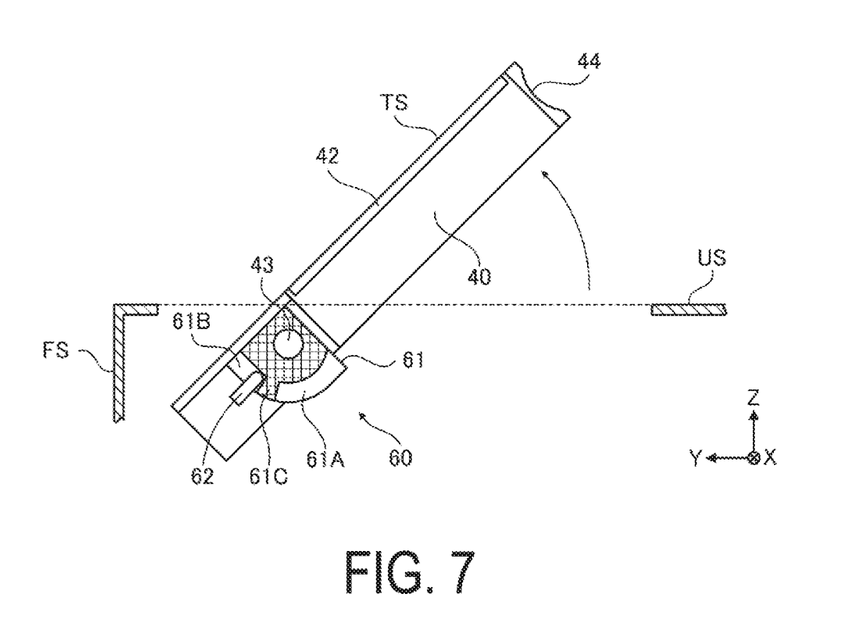
FIG. 7 is a side view illustrating a posture of the operating panel when the operating panel is rotated and is in a self-supporting position.

FIG. 5 to FIG. 7 are side views illustrating a holding mechanism by which the operating panel 40 is held in the self-supporting position. FIG. 5 illustrates a state in which the operating panel 40 is in the housed position, and FIG. 6 illustrates a state in which the pressing surface PA is pressed and a leading end portion of the operating panel 40 on the negative Y side is slightly lifted from the upper surface US of the housing 50. Further, FIG. 7 illustrates the posture of the operating panel 40 when the operating panel 40 is rotated and is in the self-supporting position.

The printer 100 includes a holding mechanism 60 for holding the operating panel 40 in the self-supporting position. Holding the operating panel 40 in the self-supporting position means that the inclined posture of the operating panel 40 is held and does not return to the housed position, even when the power switch 41 of the operating panel 40 is turned on or off, or when the user touches the operating surface TS with a finger to perform the input operation using the touch panel 42 while the operating panel 40 is in the self-supporting position.

The holding mechanism 60 is configured by a disk 61 attached to the operating panel 40, pads 62 supported by the housing 50, and the like.

The disk 61 is a plate member that extends along a Y-Z plane and is rotatable about the rotation shaft 43 together with the operating panel 40.

The pads 62 are a pair of pad members that sandwich a peripheral region of the disk 61 in the circumferential direction from the front and back of the disk 61 in the X-axis direction, and configure a disk brake structure together with the disk 61.

The thickness of the peripheral region of the disk 61 sandwiched by the pads 62 varies and includes a thickness tA of a region 61A with which the pads 62 can come into contact when the operating panel 40 is in a range from the housed position to a position slightly rotated from the housed position, a thickness tB of a region 61B with which the pads 62 can come into contact when the operating panel 40 is held in the self-supporting position, and a thickness tC with which the pads 62 can come into contact when the operating panel 40 is in a position between the position slightly rotated from the housed position and the self-supporting position. Here, tA<tB<tC is established.

From a state illustrated in FIG. 5 in which the operating panel 40 is in the housed position, to a state illustrated in FIG. 6 in which the pressing surface PA is pressed and the leading end portion of the operating panel 40 on the negative Y side is slightly lifted from the upper surface US of the housing 50, the pads 62 sandwich the thinnest region 61A of the disk 61, or alternatively, can be caused not to sandwich the disk 61. Thus, frictional resistance to the rotational movement of the operating panel 40 can be minimized in this range.

From the state in which the user slightly lifts the leading end portion of the operating panel 40 on the negative Y side from the upper surface US of the housing 50, and the user hooks a finger into the recessed portion 44 as necessary, to a state in which the operating panel 40 is rotated to the self-supporting position, the pads 62 sandwich the thickest region 61C of the disk 61 therebetween. Thus, the frictional resistance to the rotational movement of the operating panel 40 becomes highest in this range.

Once the operating panel 40 is rotated and reaches the self-supporting position, as illustrated in FIG. 7, the pads 62 sandwich the slightly thinner region 61B of the disk 61, and thus, the frictional resistance to the rotational movement becomes slightly lower. As a result, the user can sense that the operating panel 40 has reached the self-supporting position.

When the operating panel 40 is returned from the self-supporting position to the housed position, the frictional resistance is generated in the reverse order to the order described above. The frictional resistance generated when the operating panel 40 is moving to the position at which the frictional resistance is highest serves as stress for holding the operating panel 40 in the self-supporting position. This stress is caused to be only just large enough to hold the inclined rotated position of the operating panel 40, even when the power switch 41 of the operating panel 40 is turned on or off, or when the user touches the operating surface TS with a finger to perform the input operation using the touch panel 42 while the operating panel 40 is in the self-supporting position.

According to the present embodiment, the following effects can be obtained.

When the operating panel 40 is in the housed position, the exposed surface, over which the upper surface of the operating panel 40 is exposed in the upward direction, is flush with the upper surface US of the housing 50. In addition, when the pressing surface PA in the exposed surface, over which the operating panel 40 is exposed, is pressed, the operating panel 40 is rotated, and the following surface FA located on the opposite end from the pressing surface PA with the rotation shaft 43 interposed therebetween, namely, a portion of the operating panel 40, protrudes outward from the upper surface US. In other words, since the operating panel 40 is rotated by the portion of the operating panel 40 being pressed, it is not necessary to provide the upper surface US with a space for the user to hook a finger on the operating panel 40 in order to pull out the operating panel 40 from the housed position. As a result, there is no need to provide any recess or protrusion for pulling out the operating panel 40 on the upper surface US of the printer 100, and a recess or a protrusion is thus suppressed from becoming an obstacle to an improvement in design quality of the printer 100.

In addition, since the recessed portion 44 is formed in the side surface of the operating panel 40 intersecting the following surface FA, when the pressing surface PA is pressed and the operating panel 40 protrudes outward from the upper surface US, it is possible for the user to hook a finger into the recessed portion 44. By hooking the finger into the recessed portion 44 formed in the side surface of the operating panel 40, the operating panel 40 is more easily rotated to the self-supporting position.

Since the recessed portion 44 is formed in the side surface intersecting the following surface FA, namely, the side surface intersecting the exposed surface over which the operating panel 40 is exposed, when the operating panel 40 is in the housed position in which the operating panel 40 is housed in the housing 50, the exposed surface is flush with the upper surface US, and the recessed portion 44 formed in the side surface is not visible from the outside. Therefore, the recessed portion 44 does not become an obstacle to the improvement in design quality.

Further, since the pressing portion mark 45, which serves as the indication indicating the region to be pressed for pressing the pressing surface PA, makes it easier for the user to recognize the position to be pressed, usability is improved for the user.

Further, since the operating surface TS is provided at the following surface FA included in the exposed surface, the input operation can be performed even when the operating panel 40 is in the housed position. Furthermore, when the operating surface TS is provided on the pressing surface PA, there is a risk that the operating panel 40 may be rotated due to a pressing force for the input operation. However, since the operating surface TS is provided at the following surface FA, a configuration can be provided in which the operating panel 40 is not caused to rotate by the pressing force for the input operation.

Further, it is necessary to secure a region on the reverse side of the pressing surface PA as a space inside the housing 50 in which the portion of the operating panel 40 located further to the positive Y side than the rotation shaft 43 can be rotated. Since the pressing surface PA is provided in the position closer to the end portion of the upper surface US of the housing 50, namely, in the position closer to the end portion of the upper surface US on the positive Y side than the following surface FA, this space can be provided in a region close to an end portion of a space configured by the housing 50. Since the space can be relatively easily provided in the region close to the end portion of the space configured by the housing 50, the printer 100 can be configured in a more compact manner.

Note that in the present embodiment, the inkjet-type printer 100 is illustrated as an example of the information processing device, but a laser-type printer may be used as the information processing device. Further, the information processing device may be a printer, an image scanner, a facsimile, a phone, a copying machine, or a multi-functional machine that combines two or more functions.

2. First Modified Example

Figure 8:
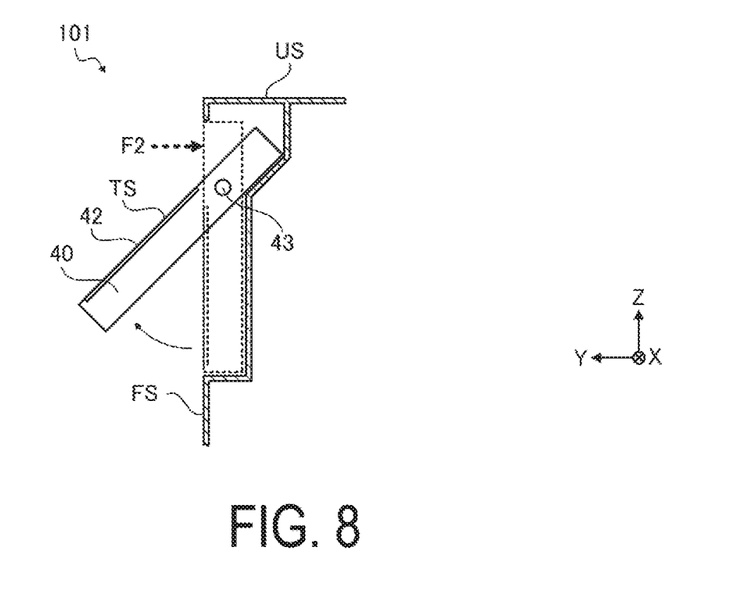
FIG. 8 is a side view illustrating a state in which the operating panel provided in a printer, which serves as an information processing device according to a first modified example, is rotated.

FIG. 8 is a side view illustrating a state in which the operating panel 40, which is provided in a printer 101 according to a first modified example, is rotated.

Figure 9:
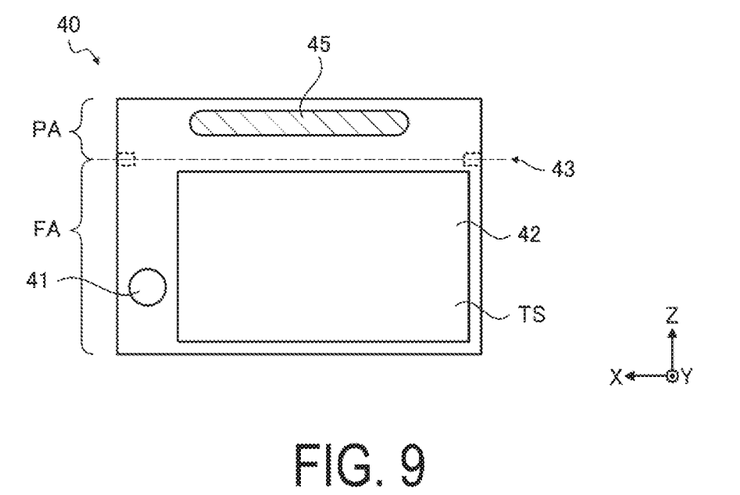
FIG. 9 is a front view illustrating a state in which the operating panel provided in the printer, which serves as the information processing device according to the first modified example, is in the housed position.

FIG. 9 is a front view illustrating a state in which the operating panel 40, which is provided in the printer 101 according to the first modified example, is in the housed position.

In the above-described embodiment, an example is given of a case in which the operating panel 40 is provided in the upper surface US of the housing 50, but the operating panel 40 may be provided in the front surface FS of the housing 50.

The operating panel 40 according to the present modified example is provided toward the upper side on the right side of the front surface FS of the housing 50 so as to be rotatable about the rotation shaft 43 and movable between the housed position in which the operating panel 40 is housed in the housing 50 and the self-supporting position in which at least a portion of the operating surface TS protrudes outward, that is, forward from the front surface FS of the housing 50 and is held in an inclined state. Here, the front surface FS is the exterior surface that configures a front surface of the housing 50.

As illustrated in FIG. 9, the pressing surface PA and the following surface FA in the operating panel 40 of the present modified example are arranged such that the pressing surface PA, the rotation shaft 43, and the following surface FA are arranged in this order in the negative Z direction when the operating panel 40 is in the housed position. Further, when the operating panel 40 is in the housed position, in a front view of the front surface FS of the housing 50, which is flush with the exposed surface of the operating panel 40, the pressing surface PA is provided in a position closer to an end portion of the front surface FS of the housing 50 in the Z-axis direction intersecting the extending direction of the rotation shaft 43, that is, the X-axis direction, namely, in a position closer to an end portion of the front surface FS on the positive Z side than the following surface FA.

Note that with the operating panel 40 of the present modified example, an orientation of the operating surface TS when viewed by the user is revered in the up-down direction. Thus, a screen of the operating panel 40 provided to perform the input operation needs to be aligned with the orientation.

In the printer 101 according to the present modified example also, since the operating panel 40 is rotated by the pressing surface PA, which is the portion of the operating panel 40, being pressed in the inward direction, namely, in a direction F2 illustrated in FIG. 8, it is not necessary to provide the front surface FS with a space for the user to hook a finger on the operating panel 40 in order to pull out the operating panel 40 from the housed position. As a result, there is no need to provide any recess or protrusion for pulling out the operating panel 40 on the front surface FS of the printer 101, and a recess or a protrusion is thus suppressed from becoming an obstacle to an improvement in design quality of the printer 101.

3. Second Modified Example

Figure 10:
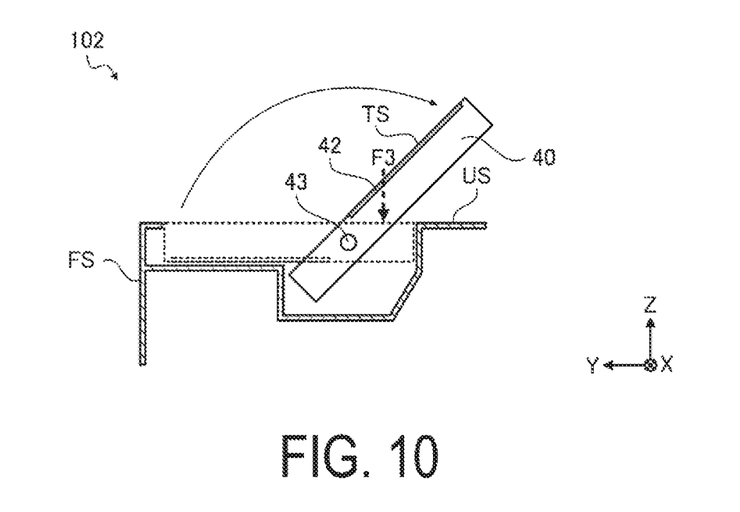
FIG. 10 is a side view illustrating a state in which the operating panel provided in a printer, which serves as an information processing device according to a second modified example, is rotated.

FIG. 10 is a side view illustrating a state in which the operating panel 40, which is provided in a printer 102 according to a second modified example, is rotated.

Figure 11:
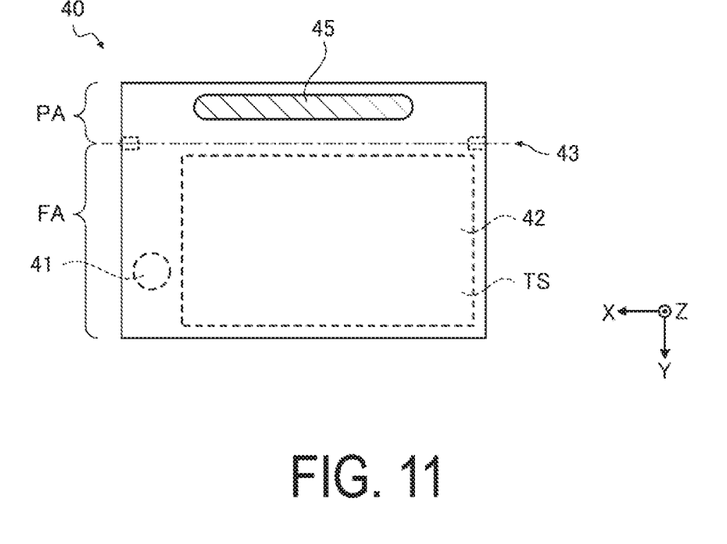
FIG. 11 is a plan view illustrating a state in which the operating panel provided in the printer, which serves as the information processing device according to the second modified example, is in the housed position.

FIG. 11 is a plan view illustrating a state in which the operating panel 40, which is provided in the printer 102 according to the second modified example, is in the housed position.

In the above-described embodiment, an example is given of a case in which the operating surface TS of the touch panel 42 capable of the input operation, and the power switch 41 are provided on the exposed surface over which the upper surface of the operating panel 40 is exposed in the upward direction. However, the operating surface TS of the touch panel 42 and the power switch 41 may be provided on the other side of the exposed surface, specifically, on the other side of the following surface FA.

The operating panel 40 according to the present modified example is provided toward the front on the right side of the upper surface US of the housing 50 so as to be rotatable about the rotation shaft 43 and movable between the housed position in which the operating panel 40 is housed in the housing 50 and the self-supporting position in which at least a portion of the operating surface TS protrudes outward, that is, upward from the upper surface US of the housing 50 and is held in an inclined state.

Further, the operating surface TS of the touch panel 42 and the power switch 41 are provided on the back surface of the following surface FA included in the exposed surface.

When the operating panel 40 is in the housed position, when the pressing surface PA located on the rear side of the operating panel 40 is pressed in the inward direction of the housing 50, that is, in a direction F3 illustrated in FIG. 10, the operating panel 40 is rotated, and the positive Y side of the operating panel 40 is lifted. When the operating panel 40 is inverted by further rotating the operating panel 40 that has been lifted, the operating surface TS of the touch panel 42 and the power switch 41 rise up so as to face the user.

As in the present modified example, by providing the operating surface TS on the back surface of the following surface FA, the exposed surface can be configured by the same member as the upper surface US. Thus, the design quality can be improved.

Figure 12:
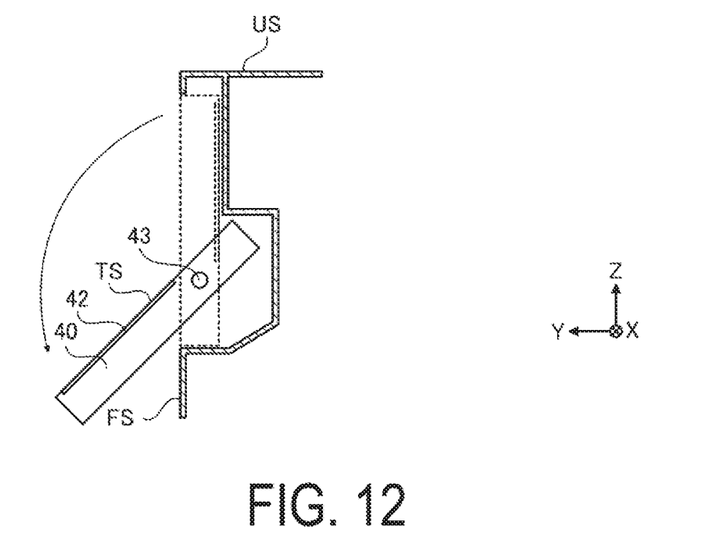
FIG. 12 is a side view illustrating an example of a case in which the operating panel according to the second modified example is provided in a front surface of the housing.

FIG. 12 is a side view illustrating an example of a case in which the operating panel 40 according to the second modified example is provided on the front face FS of the housing 50, as in the first modified example. In this case also, the exposed surface can be configured by the same member as the front surface FS in a similar manner. Thus, the design quality can be improved.

Contents derived from the embodiment will be described below.

An information processing device includes an operating panel that includes an operating surface for accepting an input operation, and a housing that includes an exterior surface and to which a rotation shaft rotationally supporting the operating panel is coupled. The operating panel is configured to rotate between a housed position in which the operating panel is housed in the housing and a self-supporting position in which at least a portion of an operating surface is held in a state of protruding outward from the exterior surface. The operating panel is provided so that an exposed surface thereof, where the operating panel is exposed, is flush with the exterior surface when the operating panel is in the housed position. The operating panel includes a pressing surface on one side and a following surface on the other side of the exposed surface with respect to the rotation shaft, in plan view of the exposed surface when the operating panel is in the housed position, the pressing surface and the following surface being arranged so that when the pressing surface is pressed, the operating panel rotates and thus the following surface protrudes outward from the exterior surface.

According to this configuration, when the operating panel is in the housed position, the exposed surface where the operating panel is exposed is provided to be flush with the exterior surface. Further, when the pressing surface, in the exposed surface where the operating panel is exposed, is pressed, the operating panel rotates, and the following surface provided at the opposite end from the pressing surface with the rotation shaft interposed therebetween, that is, the portion of the operating panel protrudes outward from the exterior surface. In other words, since the operating panel rotates by the portion of the operating panel being pressed, it is not necessary to provide the exterior surface with a space for the user to hook a finger onto the operating panel in order to pull out the operating panel from the housed position. As a result, there is no need to provide any recess or protrusion for pulling out the operating panel on the exterior surface of the information processing device, and a recess or a protrusion is thus suppressed from becoming an obstacle to an improvement in design quality of the information processing device.

In the information processing device described above, a recessed portion is formed in a side surface of the operating panel intersecting with the following surface.

According to this configuration, when the pressing surface is pressed to rotate the operating panel and cause a portion of the following surface to protrude outward from the exterior surface, it becomes possible for the user to hook a finger onto the recessed portion formed in the side surface of the operating panel. By hooking the finger onto the recessed portion formed in the side surface of the operating panel, the operating panel is more easily rotated to the self-supporting position.

Since the recessed portion is formed in the side surface intersecting the following surface, that is, the side surface intersecting the exposed surface where the operating panel is exposed, when the operating panel is in the housed position in which the operating panel is housed in the housing, the exposed surface is flush with the exterior surface, and the recessed portion formed in the side surface is not visible from the outside. Therefore, the recessed portion does not become an obstacle to the improvement in design quality.

In the information processing device described above, the pressing surface preferably includes an indication indicating a region for pressing the pressing surface.

According to this configuration, the region to be pressed for pressing the pressing surface makes it easier for the user to recognize the position to be pressed, usability is improved for the user.

In the information processing device described above, the operating panel is preferably provided at the following surface.

According to this configuration, since the operating surface is provided at the following surface of the exposed surface, the input operation can be performed even when the operating panel is in the housed position. Further, when the operating surface is provided on the pressing surface, there is a risk that the operating panel may be rotated due to a pressing force for the input operation. However, since the operating surface is provided at the following surface, a configuration can be achieved in which the operating panel is not caused to rotate by the pressing force for the input operation.

In the information processing device described above, the operating surface is preferably provided on the other side of the following surface.

According to this configuration, by providing the operating surface on the back surface of the following surface, the exposed surface can be configured by the same member as the exterior surface, and the design quality can thus be improved.

In the information processing device described above, when the operating panel is in the housed position, in plan view of the exterior surface that is flush with the exposed surface, the pressing surface is preferably provided to be closer to an end portion of the exterior surface, in a direction intersecting an extending direction of the rotation shaft, than the following surface.

According to this configuration, it is necessary to secure a region on the back side of the pressing surface as a space, inside the housing, in which the operating panel can be rotated. Since the pressing surface is provided in the position closer to the end portion of the exterior surface than the following surface, this space can be provided in a region close to an end portion of a space configured by the housing. Since the space can be relatively easily provided in the region close to the end portion of the space configured by the housing, the information processing device can be configured in a more compact manner.

What is claimed is:

1. An information processing device comprising:
    an operating panel including an operating surface for accepting an input operation; and
    a housing including an exterior surface and to which a rotation shaft rotationally supporting the operating panel is coupled, wherein
    the operating panel is configured to rotate between a housed position in which the operating panel is housed in the housing and a self-supporting position in which at least a portion of an operating surface is held in a state of protruding outward from the exterior surface,
    the operating panel is provided so that an exposed surface thereof, where the operating panel is exposed, is flush with the exterior surface when the operating panel is in the housed position,
    the operating panel includes a pressing surface on one side and a following surface on the other side of the exposed surface with respect to the rotation shaft, in plan view of the exposed surface when the operating panel is in the housed position, the pressing surface and the following surface being arranged so that when the pressing surface is pressed, the operating panel rotates and thus the following surface protrudes outward from the exterior surface.

2. The information processing device according to claim 1, wherein
    a recessed portion is formed at a side surface, which intersects the following surface, of the operating panel.

3. The information processing device according to claim 1, wherein
    the pressing surface includes an indication indicating a region for pressing the pressing surface.

4. The information processing device according to claim 1, wherein
    the operating surface is provided at the following surface.

5. The information processing device according to claim 1, wherein
    the operating surface is provided on the other side of the following surface.

6. The information processing device according to claim 1, wherein
    when the operating panel is in the housed position, in plan view of the exterior surface that is flush with the exposed surface, the pressing surface is provided to be closer to an end portion of the exterior surface, in a direction intersecting an extending direction of the rotation shaft, than the following surface is.

\* \* \* \* \*